United States Patent
Orel et al.

(10) Patent No.: US 11,649,868 B2
(45) Date of Patent: May 16, 2023

(54) TRANSMISSION UNIT FOR A MOTOR VEHICLE TRANSMISSION WITH A DRIVE GEAR ARRANGED ROTATABLY ON AN INTERMEDIATE SHAFT

(71) Applicant: Schaeffler Technologies AG & Co. KG, Herzogenaurach (DE)

(72) Inventors: Erik Orel, Skalica (SK); Luboslav Slezák, Podbranc (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 17/276,575

(22) PCT Filed: Aug. 9, 2019

(86) PCT No.: PCT/DE2019/100720
§ 371 (c)(1),
(2) Date: Mar. 16, 2021

(87) PCT Pub. No.: WO2020/064044
PCT Pub. Date: Apr. 2, 2020

(65) Prior Publication Data
US 2022/0049752 A1 Feb. 17, 2022

(30) Foreign Application Priority Data
Sep. 27, 2018 (DE) ...................... 10 2018 123 863.0

(51) Int. Cl.
*F16D 67/02* (2006.01)
*F16D 11/10* (2006.01)
(Continued)

(52) U.S. Cl.
CPC .............. *F16D 67/02* (2013.01); *F16D 11/10* (2013.01); *F16H 55/17* (2013.01);
(Continued)

(58) Field of Classification Search
CPC .. F16H 63/34; F16H 63/3416; F16H 63/3425; F16H 63/30; F16H 2063/3093;
(Continued)

(56) References Cited

U.S. PATENT DOCUMENTS 4,677,870 A * 7/1987 Alshareedah ........... F16H 55/08
74/460
6,725,962 B1 4/2004 Fukuda
(Continued)

FOREIGN PATENT DOCUMENTS

CN 102308128 A1 1/2012
CN 105705841 A1 6/2016
(Continued)

*Primary Examiner* — Richard M Lorence

(57) ABSTRACT

A transmission unit for a motor vehicle transmission includes a drive gear (6) which is arranged rotatably on an intermediate shaft (5) and which can be fixed to the intermediate shaft (5) for the transmission of drive power via clutch means. On one side flank (9) of the drive gear, a first gear portion (10) is provided which can be connected to a corresponding shaft-side second gear portion (11) via an internally toothed sliding sleeve (12). On the opposite side flank (13) of the drive gear, a parking lock gear portion (14) is provided for engaging a pawl (15) to block the transmission unit when the vehicle is at a standstill.

16 Claims, 2 Drawing Sheets

(51) Int. Cl.
  *F16H 55/17* (2006.01)
  *F16H 63/34* (2006.01)
  *F16D 11/00* (2006.01)

(52) U.S. Cl.
  CPC .... *F16H 63/3425* (2013.01); *F16D 2011/002* (2013.01); *F16H 2055/178* (2013.01)

(58) Field of Classification Search
  CPC .. F16H 63/345; F16H 55/17; F16H 2055/178; F16D 2011/002; F16D 11/10; F16D 67/02; B60T 1/005; B60T 1/062; B60Y 2200/91
  USPC .............................................. 192/219.5, 69.9
  See application file for complete search history.

(56) References Cited

U.S. PATENT DOCUMENTS

2008/0242467 A1* 10/2008 Matsushita ............. F16H 3/006
  475/206
2011/0284340 A1 11/2011 Morizumi et al.

FOREIGN PATENT DOCUMENTS

| | | | |
|---|---|---|---|
| CN | 106051147 | A | 10/2016 |
| CN | 206439348 | U | 8/2017 |
| DE | 10224357 | A1 | 12/2003 |
| DE | 102015116537 | A1 | 3/2017 |
| GB | 2525300 | A1 | 10/2015 |

\* cited by examiner

TRANSMISSION UNIT FOR A MOTOR VEHICLE TRANSMISSION WITH A DRIVE GEAR ARRANGED ROTATABLY ON AN INTERMEDIATE SHAFT

CROSS-REFERENCE TO RELATED APPLICATIONS

This application is the U.S. National Phase of PCT Appln. No. PCT/DE2019/100720 filed Aug. 9, 2019, which claims priority to DE 10 2018 123 863.0 filed Sep. 27, 2018, the entire disclosures of which are incorporated by reference herein.

TECHNICAL FIELD

The present disclosure relates to a transmission unit for a motor vehicle transmission, with a drive gear arranged rotatably on an intermediate shaft for transmitting a drive power, which can be fixed to the intermediate shaft via clutch means.

BACKGROUND

The field of application of the disclosure extends primarily to automotive engineering. In particular, in the case of automatic axle drives in electric vehicles, various separate transmission modules are usually used, which in addition to transmitting power from the electric motor, perform the functions of a parking lock and a separation of the power flow in an emergency situation. Such an emergency situation is triggered, for example, by a blocking of the motor vehicle transmission due to component failure, overloading of the drive train, exceeding maximum permissible speeds and the like. As a result, the power flow from the drive motor to the wheels of the motor vehicle is separated to avoid consequential damage. A parking lock, on the other hand, locks the motor vehicle transmission when the vehicle is at a standstill, especially in the parking position, to prevent the motor vehicle from unintentionally rolling away from the parking position even when the parking brakes are not yet applied.

From DE 10 2015 116 537 A1 arises a motor vehicle transmission of the type of interest here. The motor vehicle transmission is part of an electric axle drive and is designed to be switchable between two transmission gears. An electric motor is used to drive at least one output shaft of the axle of the motor vehicle. By means of a spur gear stage, an intermediate shaft is driven in a first switching stage, as is a spur gear that is firmly connected to the intermediate shaft. This spur gear meshes with a ring gear of a planetary gear arranged to be coaxial to the output shaft. Another spur gear can be coupled to an output shaft of the electric motor or said intermediate shaft to drive a sun gear of the planetary gear in a second switching stage. This electric axle drive is characterized by its compact design. Additional functions, such as a parking lock or a power flow separation, are not implemented with this switchable motor vehicle transmission and might need to be added through function modules additionally integrated into the power flow.

SUMMARY

It is desirable to create a transmission unit for a motor vehicle transmission which allows the integration of a parking lock and a power flow separation.

A transmission unit that can be integrated into a motor vehicle transmission comprises a drive gear arranged rotatably in a freewheeling position on an intermediate shaft, which can be fixed to the intermediate shaft for transmitting the drive power via clutch means. This drive gear is provided on one side flank with a first gear portion, which can be connected to a corresponding shaft-side second gear portion via an internally toothed sliding sleeve as a clutch means, the drive gear being provided on the opposite side flank with a parking lock gear portion for engagement for a pawl to block the transmission unit when the vehicle is at a standstill.

An advantage of the proposed arrangement is that the multifunctional transmission unit can be used as an intermediate shaft in a motor vehicle transmission to also take over the additional functions of a parking lock and power flow separation in a space-saving manner with the function of a transmission ratio into slow drive. In this respect, no separate add-on modules to the motor vehicle transmission for performing these additional functions are required. The functional integration created reduces the number of individual components and the associated assembly work is eliminated.

It is proposed that the outer diameter of the parking lock gear portion on the drive gear be designed to be smaller than the root diameter of a helical toothing portion. In addition, the outside diameter of the first gear portion should be designed to be smaller than the root diameter of the helical toothing portion and the outside diameter of the parking lock gear portion. In this respect, the first gear portion has the smallest outer diameter of the transmission unit. This design of the diameter specially tailored to the functions represents an optimum between the material expenditure to be used for the transmission unit with a sufficiently stable dimensioning for reliable power transmission. In addition, a transmission unit with such a stepped diameter design can also be machined in a simple manner in terms of production engineering.

With regard to a design that is optimal for production, it is proposed that the first gear portion and the parking lock portion are molded directly onto the drive gear, so that these functional units form a one-piece component. This one-piece component can be manufactured by machining a drop-forged semi-finished product made of steel.

It is further proposed that the function-integrated drive gear is rotatably mounted on the intermediate shaft via a needle bearing. The needle bearing is able to absorb the loads acting on the transmission unit in the radial direction in a space-saving manner. Since the function-integrated drive gear with the molded-on first gear portion and parking lock gear portion is quite wide in the axial direction, a two-row or multi-row needle bearing can also be used for roller bearings if necessary.

It is further proposed that the sliding sleeve coupling the first freewheel gear portion on the drive gear with the second gear portion on the intermediate shaft is axially adjustable via a shift fork arrangement that engages in an outer radial circumferential groove of the sliding sleeve. This results in a compact and robust unit for separating the power flow in an emergency. This is achieved in that the sliding sleeve is withdrawn from the first gear portion on the drive gear side, so that it is located completely in the area of the second gear portion on the shaft side. In this switching position of the sliding sleeve, the drive gear can rotate freely with respect to the intermediate shaft, so that the power transmission between the two transmission parts is canceled.

According to an embodiment of this separating mechanism, it is proposed that the second gear portion of the intermediate shaft have a larger outer diameter than a shaft portion adjacent thereto for receiving the needle bearing. As a result, the function-integrated drive gear can be axially supported on a shoulder formed by the shaft-side gear portion and, at the same time, a compact design of the transmission unit is achieved because of the reduced shaft diameter.

It is further proposed that the intermediate shaft is rotatably supported within the transmission unit via a first roller bearing arranged axially adjacent to the parking lock gear portion and a second roller bearing located axially adjacent to the shaft-side gear portion. Both rolling bearings can be designed as ball bearings, for example.

BRIEF DESCRIPTION OF THE DRAWINGS

Further measures are shown in more detail below together with the description of an exemplary embodiment based on the figure. In the figures.

DETAILED DESCRIPTION

Figure 1:
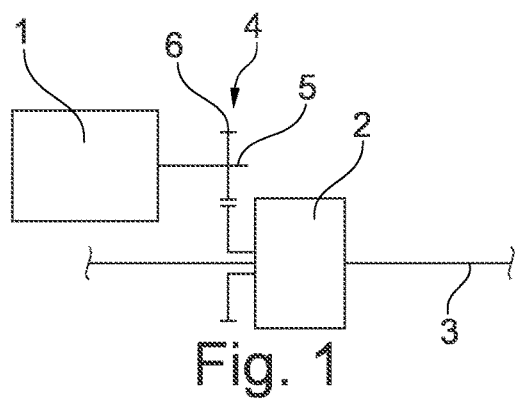
FIG. 1 shows a schematic block diagram representation of an electric axle drive with a motor vehicle transmission containing the transmission unit.

According to FIG. 1, an electric axle drive of a motor vehicle—not shown here—essentially consists of an electric motor 1, the driving force of which is transmitted to a differential gear 2 of a wheel axle 3. The engine speed generated by the electric motor 1 is reduced to a slow speed via a motor vehicle transmission 4—here only indicated schematically—to achieve the desired wheel speeds of the wheel axle 3. The motor vehicle transmission 4 comprises a function-integrated transmission unit which is arranged in the region of an intermediate shaft 5 and which, among other things, comprises a drive gear 6 for transmitting the drive power from the electric motor 1 to the differential transmission 2.

Figure 2:
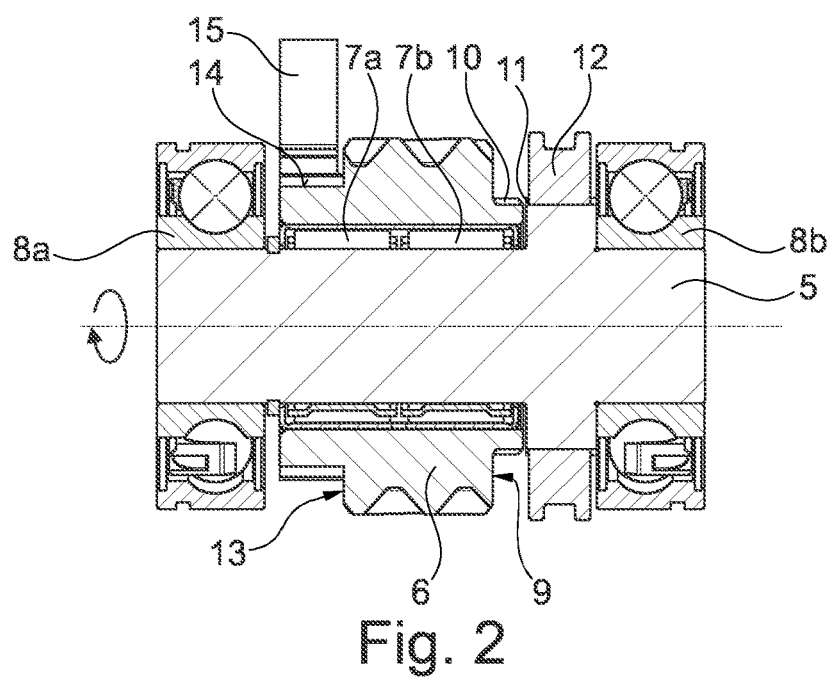
FIG. 2 shows a longitudinal section through the transmission unit according to FIG. 1.

According to FIG. 2, the drive gear 6 is in principle arranged rotatably on the intermediate shaft 5 via two needle bearings 7a and 7b arranged to be axially adjacent to one another. To transmit the drive power, however, the drive gear 6 can be fixed on the intermediate shaft 5 by means of the clutch means described below. The intermediate shaft 5 is rotatably supported by roller bearings 8a and 8b arranged on both sides of the drive gear 6 in a gear housing—not shown here.

To disconnect the power flow in an emergency, the aforementioned clutch means comprises a first gear portion 10, which is arranged on a side flank 9 of the drive gear 6 and which represents a straight-toothed sprocket which corresponds to a corresponding shaft-side second gear portion 11 having the same shape. Both gear portions 10 and 11 can be connected to an axially movable sliding sleeve 12 as a clutch means. In the connected position of the sliding sleeve 12, the drive power is transmitted from the intermediate shaft 5 to the drive gear 6 or vice versa.

The drive gear 6 also has on the opposite side flank 13 a parking lock gear portion 14 which cooperates with a pawl 15 in a manner known per se to implement the function of a parking lock. The parking lock is used to block the transmission unit in the vehicle state.

Figure 3:
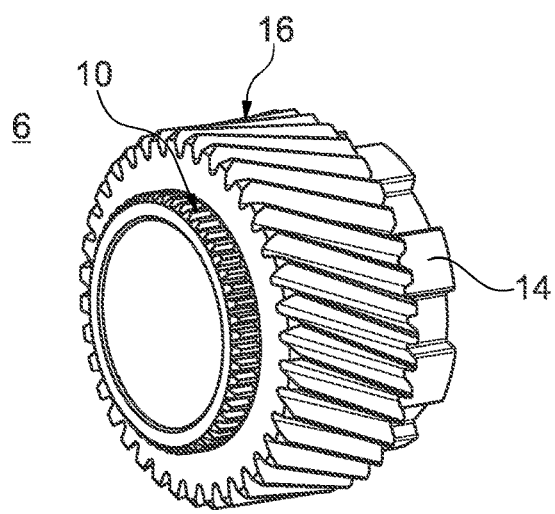
FIG. 3 shows a perspective view of a functionally integrated drive gear of the transmission unit according to FIG. 2, and FIGS. 4A to 4C show perspective views of the transmission unit in different functional positions of the parking lock and the freewheel.

According to FIG. 3, the drive gear 6 used within the scope of the transmission unit consists of a central helical toothing portion 16, the parking lock gear portion 14 formed on one side thereon with a relatively coarse tooth pitch and on the opposite side a first gear portion 10 formed thereon with a type of straight spline. The outside diameter of the parking lock gear portion 14 is smaller than the root diameter of the helical toothing portion 16 and the outside diameter of the first gear portion 10 is in turn smaller than the outside diameter of the parking lock gear portion 14.

Figure 4A:
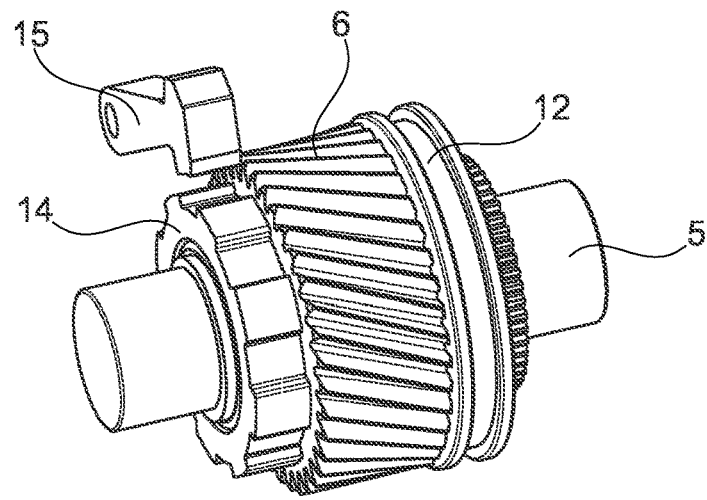

According to FIG. 4a, the transmission unit is in a functional position in which the parking lock is deactivated. To this extent, the pawl 15 is out of engagement with respect to the parking lock gear portion 14. The sliding sleeve 12 is at the same time in the position close to the drive gear, so that the drive gear 6 is fixed on the intermediate shaft 5 to transfer the drive power.

Figure 4B:
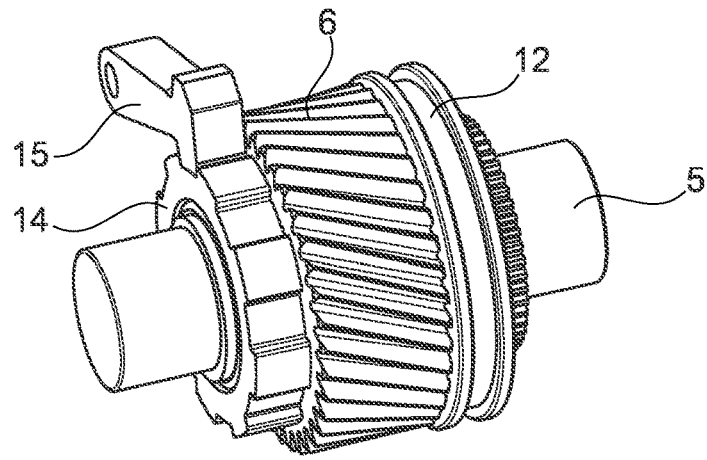

In FIG. 4b, in contrast to the functional position described above, the locking pawl 15 is engaged with the parking lock gear portion 14. The parking lock is activated when the vehicle is at a standstill, which prevents unintentional vehicle movement.

Figure 4C:
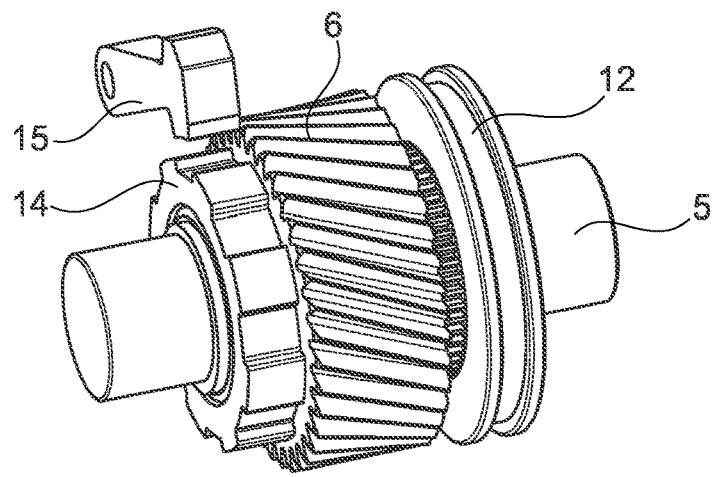

FIG. 4c illustrates the transmission unit in a functional position in which the power flow is separated as a result of an emergency when the parking lock is disengaged, that is, while the vehicle is in motion. As a result, the drive power is withdrawn from the vehicle's wheels. For this purpose, the sliding sleeve 12 is switched to the position remote from the drive gear, so that the drive gear 6 can rotate relative to the intermediate shaft 5.

The transmission unit is not restricted to the exemplary embodiment described above. For example, it is also possible for the first gear portion and/or the parking lock gear portion to be designed as separate gearwheels that are attached to a central drive gear.

REFERENCE NUMERALS

1 Electric motor
2 Differential gear
3 Wheel axle
4 Motor vehicle transmission
5 Intermediate shaft
6 Drive gear
7 Needle bearing
8 Rolling bearing
9 Side flank
10 First gear portion
11 Second gear portion
12 Sliding sleeve
13 Side flank
14 Parking lock gear portion
15 Pawl
16 Helical toothing portion

The invention claimed is:

1. A transmission unit for a motor vehicle transmission, with a drive gear which is arranged rotatably on an intermediate shaft and can be fixed to the intermediate shaft for the transmission of drive power,
wherein the drive gear is provided on a first side flank with a first gear portion which can be connected to a corresponding shaft-side second gear portion via an internally toothed sliding sleeve, and wherein the drive gear is provided on a second side flank opposite the first side flank with a parking lock gear portion to engage with a pawl to block the transmission unit when the vehicle is at a standstill, and wherein the drive gear comprises a helical toothing portion disposed between the first side flank and the second side flank, and wherein the transmission unit further comprises a needle bearing having:

a first needle bearing row at least partially disposed radially inside of the first gear portion and the helical toothing portion; and a second needle bearing at least partially disposed radially inside of the parking lock gear portion and the toothing gear portion.

2. The transmission unit according to claim 1, wherein an outside diameter of the parking lock gear portion is smaller than a root diameter of the helical toothing portion.

3. The transmission unit according to claim 1, wherein an outside diameter of the first gear portion is smaller than a root diameter of the helical toothing portion and smaller than an outside diameter of the parking lock gear portion.

4. The transmission unit according to claim 1, wherein the drive gear is a one-piece component with an integrally formed first gear portion, an integrally formed parking lock gear portion, and an integrally formed helical toothing portion.

5. The transmission unit according to claim 4, wherein the one-piece component is manufactured from steel by machining a drop-forged semi-finished product.

6. The transmission unit according to claim 1, wherein the sliding sleeve coupling the first gear portion to the second gear portion is axially adjustable via a shift fork arrangement engaging in an outer radial circumferential groove of the sliding sleeve.

7. The transmission unit according to claim 1, wherein the second gear portion of the intermediate shaft has a larger outer diameter than a shaft portion adjacent thereto for receiving the first and second needle bearings.

8. The transmission unit according to claim 1, wherein the intermediate shaft is supported via a first roller bearing axially adjacent to the parking lock gear portion and a second roller bearing axially adjacent to the shaft-side second gear portion.

9. An electric axle drive of a motor vehicle, with a motor vehicle transmission arranged between an electric motor and a differential gear for reducing the engine speed, which includes a function-integrated transmission unit according to claim 1.

10. A transmission comprising:

a shaft having a shaft-side gear portion;

a gear rotatably supported about the shaft, the gear having a gear-side gear portion, a helical toothing portion, and a parking gear portion;

a sleeve configured to move axially between a first position in which it rotationally couples the gear-side gear portion to the shaft-side gear portion and a second position in which the gear and the shaft are free to have different rotational speeds; and a needle bearing having:

a first needle bearing row at least partially disposed radially inside of the gear-side gear portion and the helical toothing portion; and a second needle bearing row at least partially disposed radially inside of the parking gear portion and the helical toothing portion.

11. The transmission of claim 10 wherein, in the second position, the sleeve engages the shaft-side gear portion but does not engage the gear-side gear portion.

12. The transmission of claim 10 further comprising a parking pawl configured to engage the parking gear portion such that a rotational speed of the gear is constrained to be equal to zero.

13. The transmission of claim 10 wherein a root diameter of the helical toothing portion exceeds an outer diameter of the parking gear portion.

14. The transmission of claim 13 wherein the outer diameter of the parking gear portion exceeds an outer diameter of the gear-side gear portion.

15. The transmission of claim 10 wherein an outer diameter of the parking gear portion exceeds an outer diameter of the gear-side gear portion.

16. The transmission of claim 10 wherein a root diameter of the helical toothing portion exceeds an outer diameter of the gear-side gear portion.

* * * * *